US010149149B2

(12) United States Patent
Noldus et al.

(10) Patent No.: US 10,149,149 B2
(45) Date of Patent: Dec. 4, 2018

(54) METHOD, SYSTEM AND DEVICE FOR ACCESSING DATA STORAGE IN A TELECOMMUNICATIONS NETWORK

(71) Applicant: Telefonaktiebolaget LM Ericsson (publ), Stockholm (SE)

(72) Inventors: Rogier August Caspar Joseph Noldus, Goirle (NL); Arturo Martin de Nicolas, Aachen (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/324,292

(22) PCT Filed: Aug. 22, 2014

(86) PCT No.: PCT/EP2014/067891
§ 371 (c)(1),
(2) Date: Jan. 6, 2017

(87) PCT Pub. No.: WO2016/026535
PCT Pub. Date: Feb. 25, 2016

(65) Prior Publication Data
US 2017/0208456 A1    Jul. 20, 2017

(51) Int. Cl.
*H04W 8/24* (2009.01)
*H04L 29/08* (2006.01)
(Continued)

(52) U.S. Cl.
CPC .......... *H04W 8/24* (2013.01); *H04L 67/1097* (2013.01); *H04W 4/60* (2018.02); *H04W 8/22* (2013.01)

(58) Field of Classification Search
CPC ...... H04W 8/24; H04L 67/1097; H04L 12/66; H04L 67/1095; H04M 1/7251
(Continued)

(56) References Cited

U.S. PATENT DOCUMENTS 8,559,933 B1* 10/2013 Delker .................... H04W 4/06
370/328
2009/0003562 A1* 1/2009 Inada .................. H04M 1/2535
379/93.05
2011/0153696 A1 6/2011 Saxena et al.
(Continued)

FOREIGN PATENT DOCUMENTS

WO    2013164428 A1    11/2013

*Primary Examiner* — Danh C Le
(74) *Attorney, Agent, or Firm* — Coats & Bennett, PLLC

(57) ABSTRACT

Method of accessing in a telecommunication network a Network Based Personal Data Storage, NB-PDS, associated with a User Equipment, UE, said telecommunication network comprising a control server and a Personal Data Storage Server, PDSS, enabling access to said NB-PDS, comprising the steps of transmitting an indication of supporting NB-PDS functionality, retrieving, by said control server, in response to receiving said indication, an Access Point Name, APN, of an access point server, for accessing said PDSS through a data bearer connection, establishing, under control of said control server, said data bearer connection between said UE and said access point server, establishing, under control of said access point server, a data connection between said UE and said PDSS over said data bearer connection providing data access by said UE to said associated NB-PDS, and presenting a file directory of said associated NB-PDS in a file directory structure of said UE.

18 Claims, 8 Drawing Sheets

(51) Int. Cl.
*H04W 4/60* (2018.01)
*H04W 8/22* (2009.01)

(58) Field of Classification Search
USPC .......... 455/414.3, 550.1, 418, 414.1; 726/5; 709/217
See application file for complete search history.

(56) References Cited

U.S. PATENT DOCUMENTS

| | | | |
|---|---|---|---|
| 2012/0023065 A1 | 1/2012 | DeWeese et al. | |
| 2012/0109997 A1* | 5/2012 | Sparks | G06F 17/30029 707/769 |
| 2012/0331532 A1* | 12/2012 | Walters | H04L 12/66 726/5 |
| 2013/0012159 A1* | 1/2013 | Lodeweyckx | H04W 8/183 455/406 |
| 2013/0132517 A1* | 5/2013 | Griff | H04L 41/12 709/217 |
| 2013/0163537 A1* | 6/2013 | Anderson | H04W 72/1284 370/329 |
| 2013/0226876 A1 | 8/2013 | Gati et al. | |
| 2014/0012949 A1* | 1/2014 | Meyers | H04L 67/1095 709/217 |
| 2014/0086177 A1* | 3/2014 | Adjakple | H04W 12/08 370/329 |
| 2014/0226594 A1 | 8/2014 | Liu | |
| 2015/0058762 A1* | 2/2015 | Sato | G06F 3/04845 715/763 |
| 2015/0189689 A1* | 7/2015 | Wang | H04L 5/0055 370/329 |

\* cited by examiner

METHOD, SYSTEM AND DEVICE FOR ACCESSING DATA STORAGE IN A TELECOMMUNICATIONS NETWORK

TECHNICAL FIELD

The present invention generally relates to data communications and, more specifically, to collecting and storing data items in a data storage in a telecommunications network, in particular a mobile telecommunications network.

BACKGROUND

Many applications on a mobile User Equipment, UE, such as mobile phones, smart phones, tablet computers and the like collect data and store these data in designated file directories on the UE or on a non-volatile memory device such as a Secure Digital, SD, card, for example. With the increased use of multimedia applications on a UE, like picture, sound, video, text, presentations, mail and other messaging data processing, besides speech communication, data storage capacity on the UE becomes critical. This, despite that the data storage capacity of UEs is continuously increasing with each new model or device type. Hence, data storage is often a limiting factor in the day to day use of a UE.

Prior art data storage may involve, for example, on-line backup: the end-user may backup his UE based data items in a data storage provided by a data storage provider, like off-line backup of data at a storage device connected to a Personal Computer, PC, or the like—generally entails that the data is replicated between UE and the data storage. Although this is a secure method for data safety, it still means that the data is kept in the UE, or on the SD card, for example, with a copy in the backup data storage. Hence, the data storage requirement on the UE is not reduced.

Another known data storage includes 'share' towards a network application: data items kept on the UE can be 'shared' with a network application provided by a third party, such as a third party running a social media application or the like. Again, the data item, e.g. a picture, is safely stored in a data storage controlled by the particular network application, this neither relaxes the data storage requirement on the UE.

To partially remedy the dilemma of the above-listed network based alternatives, the end-user may delete a data item from the UE, after that data item has been transferred to a network location, as described above. This has the disadvantage, however, that the user has the data no longer locally available. Although this is deemed acceptable for certain applications, such as pictures, it may form a dilemma for certain use cases, such as documents, which are to be processed or otherwise used on the UE and which must be readily available.

It is further observed that when data items are 'shared' towards some form of network based storage, these data items will be available, once stored in the network data storage, through selected applications only. For example, when using a dedicated picture storage application, the data items, i.e. pictures, can be subsequently retrieved only through this dedicated application. This represents, in a way, a general shortcoming of the available 'sharing' solutions, namely that they are restricted to specific applications.

So-called cloud storage systems allow for storing data of arbitrary kind in cloud based storage systems. Cloud storage systems operate, by design and intentionally, independent from the mobile telecommunications network to allow users from an arbitrary device, including a desktop personal computer, for example, access to the data storage via the public Internet, for example.

To free space at the local storage in the UE or at an associated SD card, the user has to delete the local copy of the data items that are stored in the cloud. Again, deleting the local copy has the disadvantage that the available user data is no longer visible on the UE.

In practice, when using a backup or cloud storage solution as described above, i.e. a network based storage, the user is each time facing the problem which data items are to be kept at the UE to remain directly 'visible' from the file directory of the local storage at the UE, and which data items may be moved to and are consequently only visible, i.e. indirectly 'visible', from the cloud storage file directory.

Although users generally may store and consequently retrieve or collect all their data items with the cloud storage, such that the file directory of the cloud storage contains all available data items, new or fresh data items produced during a communication session or other use of the UE are locally stored with the UE. Accordingly, as long as these new data items are not stored in the cloud, the user still faces the problem of not having a real time, comprehensive overview of the available data items.

Besides the lack of a clear and comprehensive overview of all the momentarily available data items, i.e. either UE based and/or network based, in particular during an ongoing storage of data, the UE may run out of available storage space. This poses a severe limitation and problem on the use of the UE for streaming data producing applications, such as video recordings by the UE.

SUMMARY

It is an object to provide methods for Network Based Personal Data Storage, NB-PDS, providing a comprehensive, secure and up to date overview of data items stored in both a network and a User Equipment, UE, i.e. local, based data storage.

It is another object to provide for a control server, a subscription server and a UE for facilitating access in a telecommunication network to a NB-PDS associated with a UE.

In a first aspect of the invention, there is provided a method of accessing in a telecommunication network a Network Based Personal Data Storage, NB-PDS, associated with a User Equipment, UE, the telecommunication network comprising at least a control server and a Personal Data Storage Server, PDSS, enabling access to the NB-PDS, the method comprising the steps of:

transmitting, by the UE, to the control server, an indication of supporting NB-PDS functionality;

retrieving, by the control server, in response to receiving the indication, an Access Point Name, APN, of an access point server for accessing the PDSS through a data bearer connection in the telecommunication network;

establishing, under control of the control server, the data bearer connection between the UE and the access point server;

establishing, under control of the access point server, a data connection between the UE and the PDSS over the data bearer connection providing data access by the UE to the associated NB-PDS, and presenting, by the UE, a file directory of the associated NB-PDS in a file directory structure of the UE over the established data connection.

The method is based on the insight that any file directory and data items comprised by the associated NB-PDS should be presented by the UE as if the file directory and/or the data items are in a file directory structure of the UE itself. As such, a user of the UE will experience as if the file directory of the associated NB-PDS, and thus also the content of the file directory, i.e. the stored data items, is present locally, i.e. at the UE. The benefit hereof is that the UE does not need to perform cumbersome actions to access any of its data items which are stored in the network, as the file directory structure of the UE also reflects the file directory of the associated NB-PDS.

The inventors noted that, in order to accomplish the above, a data bearer connection should be established between the UE and the access point server, wherein the access point server is acting as a gateway to external packet data networks. Using the data bearer connection, a UE is then able to initiate establishment of a data connection between itself and the PDSS, residing in an external packet data network, for accessing its associated NB-PDS. Such a data connection may then be utilized for presenting the file directory of the associated NB-PDS in a file directory structure of the UE.

A further advantage of the present invention is that the data transfer between the PDSS and the UE occurs within the telecommunication network, and thus under control of the telecommunications network operator. The data transfer between the PDSS and the UE is therefore inherently more secure, as authentication and security is controlled by the telecommunication network in stead of, for example, the public internet.

In the context of the present invention, transmitting an indication of supporting NB-PDS functionality comprises, for example, transmitting an Attach Request message for requesting access to the telecommunication network, wherein the Attach Request comprises a parameter indicating that the UE is capable or suitable for NB-PDS. In another example the indication is comprised by a request for setting up a data bearer connection to an access point server, wherein the request comprises the access point name of the access point server. In yet another example, the indication is comprised in a request from the UE for directly requesting access to its associated NB-PDS. Such a request may be handled by the control server by providing the UE with an APN of an access point server to which the UE may initiate establishment of a data bearer connection.

Another advantage of the present invention is that the PDSS is under control of the telecommunications network operator, such that the telecommunications network operator may, for example if allowed by the UE, store, amend, delete any subscription data for the UE directly in the associated NB-PDS of the UE. Such data may then be communicated to the user, i.e. the UE, via the file directory of the associated NB-PDS presented in the file directory structure of the UE.

Such so called telecommunications operator provided data may comprise voicemail recordings, wherein these recordings may be made available as media files in the associated NB-PDS, allowing the user, i.e. the UE, to replay or download these files. The telecommunications operator provided data may further comprise call recording, i.e. recordings of call sessions the user has indicated to record, or communication usage overviews in which the user is able to see the number of call minutes and data volume usage, distributed of the users multitude of devices, i.e. multiple UE's.

Such media files may be stored, for example, in a sub-directory of the associated NB-PDS. In this manner, the user, i.e. the UE, has convenient access to these files. The particular sub-directory may, for example, be classified as read only, such that only the telecommunications operator is able to amend, store and delete the telecommunications operator provided data provided therein.

In accordance with the present invention, the PDSS enables access to the NB-PDS. This means that either the NB-PDS is comprised within the PDSS or that the NB-PDS is directly accessible for the PDSS, for example within a perimeter network or the like.

In the context of the present invention, the data connection over the data bearer connection may be any of a FTP, HTTP, SSH, HTTPS, SFTP connection or the like.

In an example, the telecommunication network comprises any of an Evolved Packets System, EPS, network, a Universal Mobile Telecommunications System, UMTS, network and a General Packet Radio Service, GPRS, network.

In a further example, the control server comprises any of a Mobility Management Entity, MME, and a Supporting General Packet Radio Service, GPRS, Support Node, SGSN.

In another example, the access point server comprises any of Packet Data Network, PDN, Gateway, PDN-Gw, and a Gateway General Packet Radio Service, GPRS, Support Node, GGSN.

In yet a further example, the PDSS comprises any of a Home Subscriber Server, HSS, a HSS Front-End, HSS-FE, and a Centralized User Data Base, CUDB. The advantage of an CUBD and an HSS is that these nodes or servers already comprise databases having subscription records of its users. These databases further comprise a high level of reliability, security functionality, auditing capability, data backup, data integrity, etc., which all contribute to the quality of service of the NB-PDS.

In a second aspect, there is provided a method of facilitating access in a telecommunication network to a Network Based Personal Data Storage, NB-PDS, associated with a User Equipment, UE, the telecommunication network comprising at least a control server and a Personal Data Storage Server, PDSS, enabling access to the NB-PDS, the method comprising the steps of:

receiving, by the control server, from the UE, an indication of supporting NB-PDS functionality by the UE;

retrieving, by the control server, in response to the indication, an Access Point Name, APN, of an access point server, for accessing the PDSS over a data bearer connection in the telecommunication network;

establishing, under control of the control server, the data bearer connection between the UE and the access point server.

The inventors noted that, the above stated problem may be solved by adapting a conventional control server such that it is able to perform the method steps according to the present invention. That is, under control of the control server, a specific data bearer connection between the access point server and the UE should be set up, which data bearer connection is designed for enabling a transparent data connection between the UE and the PDSS, using the APN retrieved by the control server.

Hereto, the control server may be adapted such that it is able to detect the indication of supporting NB-PDS functionality by the UE, and, in response thereto, retrieve an APN of an access point server for accessing the PDSS over the data bearer connection in the telecommunication network.

In an example, the step of receiving the indication comprises:

receiving, by the control server, an Attach request message comprising the indication of supporting NB-PDS functionality by the UE.

The advantage of incorporating the indication in an Attach request message is that the associated NB-PDS is made available for the UE each time the UE attaches to the telecommunication network. As such, a user, or the UE, does not need to separately and/or independently, transmit a specific request to the control server for requesting access to its associated NB-PDS. As such, any time a UE is attached to the telecommunication network, also a data connection between the UE and the PDSS of the established data bearer connection may be automatically established, i.e. without requiring any input from the user or UE.

In a further example, the method further comprises the step of:

transmitting, by the control server, an Attach accept message comprising the APN of the access point server for establishing the data bearer connection in the telecommunication network.

One of the advantages of this example is that no additional signalling is introduced, such that NB-PDS functionality may be supported for a UE without introducing additional overhead for the telecommunication network.

The UE may then use the information comprised in the Attach accept message, i.e. the APN of the access point server, to establish a data bearer connection to the access point server, which data bearer connection may be specifically established and/or designed for enabling access to the PDSS, using the access point server.

In another example, the step of retrieving, by the control server, the APN comprises:

requesting, by the control server, at a subscription server associated with the UE, whether the UE subscribes to an NB-PDS service, i.e. whether the NB-PDS is associated with the UE;

receiving, by the control server, from the subscription server, in response to the request, indication that the UE subscribes to an NB-PDS service, i.e. information that the NB-PDS is associated with the UE.

Here, the APN used for establishing the data bearer connection to the access point server may be available at the control server itself. The control server may, for example, provide a generic APN to the UE, which the UE may also use for accessing its associated NB-PDS, or select one of a plurality of APN's available to the control server for establishing the desired data bearer connection.

In yet a further example, the step of receiving, by the control server, from the subscription server, further comprises:

receiving from the subscription server the APN of the access point server for accessing the PDSS in the telecommunication network.

In an even further example, the step of receiving, by the control server, the indication comprises:

receiving, from the UE, a request message for initiating establishment of the data bearer for accessing the PDSS.

The step of retrieving, by the control server, the APN may further comprise:

retrieving an APN configured in the control server for establishing the data bearer connection in the telecommunication network.

In a third aspect of the invention, there is provided a method of facilitating access in a telecommunication network to a Network Based Personal Data Storage, NB-PDS, associated with a User Equipment, UE, the telecommunication network comprising at least a control server, a subscription server and a Personal Data Storage Server, PDSS, enabling accessing the NB-PDS, the method comprising the steps of:

receiving, by the subscription server, a request message comprising an indication of supporting NB-PDS functionality;

determining, by the subscription server, that the NB-PDS is associated with the UE;

transmitting, by the subscription server, information that the NB-PDS is associated with the UE.

In a fourth aspect of the present invention, there is provided a method of accessing in a telecommunication network a Network Based Personal Data Storage, NB-PDS, associated with a User Equipment, UE, the telecommunication network comprising at least a control server and a Personal Data Storage Server, PDSS, enabling access to the NB-PDS, the method comprising the steps of:

transmitting, by the UE, an indication of supporting NB-PDS functionality;

receiving, by the UE, in response to the transmitted indication, an Access Point Name, APN, of an access point server for accessing the PDSS through a data bearer connection in the telecommunication network;

initiating, by the UE, establishment of the data bearer connection between the UE and the access point server initiating, by the UE, establishment of a data connection to the PDSS over the established data bearer connection providing data access by the UE to the associated NB-PDS, and presenting, by the UE, a file directory of the associated NB-PDS in a file directory structure of the UE.

In an example hereof the UE comprises a visual indication representing the file directory, which visually reflects whether the NB-PDS is accessible for the UE.

The above mentioned visual indication may comprise an indication in the file directory structure that the UE is subscribed to the NB-PDS service, or an indication in the file directory structure that the PDSS, and thus also the NB-PDS, is currently accessible or inaccessible.

In another example, the UE comprises a local copy of metadata of content of the file directory.

The advantage hereof is that a user, or the UE, is able to view the content of its associated NB-PDS locally as the metadata of that content is available locally. In case the user, or the UE, want to access the content, a data connection is to be set up between the UE and the PDSS.

In a fifth aspect of the invention, there is provided a control server arranged for facilitating access in a telecommunication network to a Network Based Personal Data Storage, NB-PDS, associated with a User Equipment, UE, the telecommunication network at least comprising a control server and a Personal Data Storage Server, PDSS, providing access to the NB-PDS, the control server comprising:

receiving equipment arranged for receiving an indication of supporting NB-PDS functionality;

retrieving equipment arranged for retrieving in response to the indication, an Access Point Name, APN, of an access point server for accessing the PDSS through a data bearer connection in the telecommunication network;

control equipment arranged for controlling establishment of the data bearer connection between the UE and the APN providing data access to the associated NB-PDS and for controlling establishment of a data connection between the UE and the PDSS over the data bearer connection providing data access by the UE to the associated NB-PDS.

In a sixth aspect of the invention, there is provided a subscription server for facilitating access in a telecommunication network to a Network Based Personal Data Storage, NB-PDS, associated with a User Equipment, UE, the telecommunication network at least comprising a control server, a subscription server and a Personal Data Storage Server, PDSS, enabling access to the NB-PDS, the subscription server comprising:

receiving equipment arranged for receiving a request message comprising an indication of supporting NB-PDS functionality;

determining equipment arranged for determining that the NB-PDS is associated with the UE;

transmitting equipment arranged for transmitting information that the NB-PDS is associated with the UE.

In an example, the subscription server is any of a Home Subscriber Server, HSS, a HSS Front-End, HSS-FE, and a Centralized User Data Base, CUDB.

In a seventh aspect of the invention, there is provided a User Equipment, UE, arranged for accessing in a telecommunication network a Network Based Personal Data Storage, NB-PDS, associated with the UE, the telecommunication network at least comprising a control server and a Personal Data Storage Server, PDSS, enabling access to the NB-PDS, the UE comprising:

transmitting equipment arranged for transmitting an indication of supporting NB-PDS functionality;

receiving equipment arranged for receiving in response to the transmitted indication, an Access Point Name, APN, of an access point server for accessing the PDSS through a data bearer connection in the telecommunication network;

establishing equipment arranged for initiating establishment of the data bearer connection between the UE and the access point server, and for initiating establishment of a data connection to the PDSS over the established data bearer connection providing data access by the UE to the associated NB-PDS, and presenting equipment arranged for presenting a file directory of the associated NB-PDS in a file directory structure of the UE.

In order to provide for a UE according to the present invention, conventional UE's may download an application, App, or the like, which app is supporting the transmitting equipment, receiving equipment, establishing equipment and presenting equipment in their role for accessing the NB-PDS such that the file directory of its associated NB-PDS may be presented in a file directory structure of the UE. In another option, the UE may be amended itself such that it comprises native application software which supports the NB-PDS functionality as required.

In an eight aspect of the invention, there is provided a non-transitory computer-readable storage medium, comprising instructions which, when executed on at least one processor, cause the at least one processor to carry out the method according to any of the claims 6-16.

In an example there is provided a control server arranged for facilitating access in a telecommunication network to a Network Based Personal Data Storage, NB-PDS, associated with a User Equipment, UE, the telecommunication network at least comprising a control server and a Personal Data Storage Server, PDSS, controlling the NB-PDS, the control server comprising:

receiving module for receiving an indication of supporting NB-PDS functionality;

retrieving module for retrieving in response to the indication, an Access Point Name, APN, of an access point server for accessing the PDSS through a data bearer connection in the telecommunication network;

control module for controlling establishment of the data bearer connection between the UE and the PDSS providing data access to the associated NB-PDS and for controlling establishment of a data connection between the UE and the PDSS over the data bearer connection providing data access by the UE to the associated NB-PDS.

In an example, there is provided a subscription server for facilitating access in a telecommunication network to a Network Based Personal Data Storage, NB-PDS, associated with a User Equipment, UE, the telecommunication network at least comprising a control server, a subscription server and a Personal Data Storage Server, PDSS, enabling access to the NB-PDS, the subscription server comprising:

receiving module for receiving a request message comprising an indication of supporting NB-PDS functionality;

determining module for determining that the NB-PDS is associated with the UE;

transmitting module for transmitting information that the NB-PDS is associated with the UE.

In an example, there is provided a User Equipment, UE, arranged for accessing in a telecommunication network a Network Based Personal Data Storage, NB-PDS, associated with the UE, the telecommunication network at least comprising a control server and a Personal Data Storage Server, PDSS, enabling access to the NB-PDS, the UE comprising:

transmitting module for transmitting an indication of supporting NB-PDS functionality;

receiving module for receiving in response to the transmitted indication, an Access Point Name, APN, of an access point server for accessing the PDSS through a data bearer connection in the telecommunication network;

establishing module for initiating establishment of the data bearer connection between the UE and the access point server, and for initiating establishment of a data connection to the PDSS over the established data bearer connection providing data access by the UE to the associated NB-PDS, and presenting module for presenting a file directory of the associated NB-PDS in a file directory structure of the UE.

In a ninth aspect of the invention, there is provided a telecommunication network arranged for facilitating access in a telecommunication network to a Network Based Personal Data Storage, NB-PDS, associated with a User Equipment, UE, the telecommunication network at least comprising a control server and a Personal Data Storage Server, PDSS, enabling access to the NB-PDS, wherein the UE is arranged for:

transmitting, to the control server, an indication of supporting NB-PDS functionality;

wherein the control server is arranged for:

retrieving in response to receiving the indication, an Access Point Name, APN, of an access point server for accessing the PDSS through a data bearer connection in the telecommunication network;

establishing the data bearer connection between the UE and the access point server, and establishing a data connection between the UE and the PDSS over the data bearer connection providing data access by the UE to the associated NB-PDS;

wherein the UE is further arranged for:

presenting a file directory of the associated NB-PDS in a file directory structure of the UE.

In the context of the present invention, a module, device, equipment, or the like may also be implemented as a computer program running on the processor.

The expressions, i.e. the wording, of the different aspects comprised by the location server according to the present invention should not be taken literally. The wording of the aspects is merely chosen to accurately express the rationale behind the actual function of the aspects.

In accordance with the present invention, different aspects applicable to the above mentioned examples of the method, including the advantages thereof, correspond to the aspects which are applicable to the control server, the subscription server as well as the UE, according to the present invention.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below in connection with a particular type of location server or with a particular type of mobile network.

DETAILED DESCRIPTION

Figure 1:
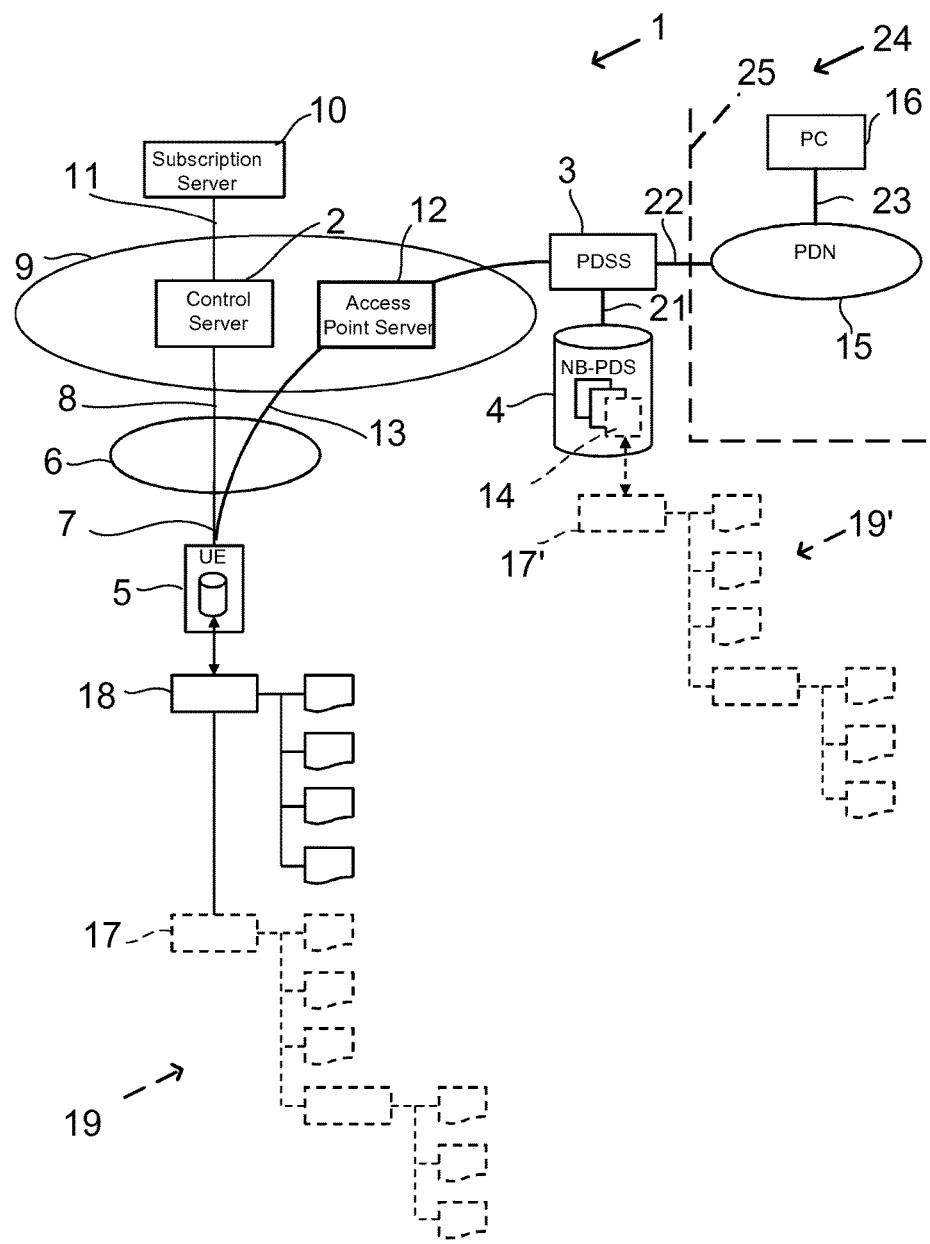
FIG. 1 is a block diagram illustrating an embodiment of a telecommunication network.

FIG. 1 is a block diagram illustrating a schematic view of a telecommunication network 1 according to the present invention, comprising a control server 2, a Personal Data Storage Server, PDSS, 3, which PDSS 3 is enabling access to a Network Based Personal Data Storage, NB-PDS, 4 and a User Equipment, UE, 5.

The UE 5 is wirelessly connected via link 7 to the access network 6. The access network 6 may be an Evolved UMTS Terrestrial Radio Access Network, E-UTRAN, i.e. a part of a Long Term Evolution network. The E-UTRAN may comprise an E-UTRAN Node B, also known as Evolved Node B, which is arranged to communicate to the UE 5.

The E-UTRAN Node B is connected to the control server 2 of the Evolved Packet Core, EPC, network 9 via link 8. The control server 2 may be arranged as a Mobility Management Entity, MME. The MME 2 is considered as the control node for the LTE access network, i.e. the E-UTRAN. It 2 is, amongst other, responsible for idle mode UE paging and tagging procedure including retransmission. It 2 is further involved in the establishment and de-establishment process for data and voice bearers between the UE 5 and another entity.

The MME 2 is responsible for authenticating the UE by interacting with the subscription server 10, i.e. the Home Subscriber Server, HSS, 10 via link 11.

An SGW routes and forwards user data packets between UE and Access point server, while a PGN-Gw acts as the mobility anchor for the user plane during inter Evolved Node B handovers as well as the anchor for mobility between LTE and other 3GPP technologies.

The EPC network 9 further comprises an access point server 12 which provides connectivity from the UE 5 to external packet data networks. The access point server 12 may be arranged as a Packet Data Network Gateway, PGW, 15 which is considered the point of exit and entry of traffic for the UE 5. The UE 5 may have simultaneous connectivity with more than one PGW 12 for accessing multiple, different PDN's. The PGW 12 performs, amongst other, policy enforcement, packet filtering for the UE 5, charging support, lawful interception and packet screening.

In accordance with the present invention, the PDSS 3 is comprised within the telecommunication network. The telecommunication network, in this example, is an Evolved Packet System comprising the EPC network 9 as well as the LTE access network, i.e. the E-UTRAN 6.

The PDSS 3 is facilitating access to the NB-PDS 4 via link 21, wherein the NB-PDS 4 may comprise a plurality of storage spaces, each assigned to a UE attached to the telecommunication network. In order to provide for a data connection between the UE 5 and its assigned storage space at the NB-PDS 4, a data bearer connection 13 between the UE 5 and the access point server 12 is to be established for facilitating the data access to the associated NB-PDS 14.

The NB-PDS 4 may be a storage space locally at the PDSS 3, or may be a storage space under direct control of the PDSS 3, i.e. a storage space with a direct functional connection to the PDSS 3.

The PDSS 3 may also be contacted via another PDN 15, e.g. the public internet 15 using link 22 and link 23. The associated NB-PDS 14 can then be accessed by a PC 16 connected to the internet 15. As such, the left hand side of the dashed line indicated with reference numeral 25 is under control of the telecommunications network operator, which is the telecommunications network 1, and the right hand side of the dashed line 25 is, for example, a public based data network 24 like the internet, and not under supervision and/or control of the telecommunications network operator.

In another example, the PDSS 3 is only accessible via the telecommunication network, not via a public based data network 24 like the internet.

The basic concept of the invention is that the UE 5, i.e. a subscriber to the telecommunication network, has access to their associated NB-PDS 14. When the UE 5 attaches to the telecommunication network, for example the EPS, the terminal receives, as part of the attachment procedure, a dedicated Access Point Name of an access point server 12 to be used for establishing a data bearer connection 13 to that access point server 12 for providing data access to its associated NB-PDS 14 enabled by the PDSS 3.

That data bearer connection 13 is thus designated for accessing the associated NB-PDS 14. This data bearer connection 13 may support a transparent data communication channel between the UE 15, for example an application running on the UE 15, and the PDSS 3.

Once the data bearer connection 13 is established, the UE 5 may alter, move, copy, and delete files in the associated NB-PDS 14 as if the associated NB-PDS 14 was a file directory present on the UE 5.

The UE 5 is then arranged to show the associated NB-PDS 14 as a regular file directory 17 in a file directory structure 19, just like the regular file directory 18. A user can thus freely move files to and from that file directory 17. When opening the file directory 17 on the UE 5, the UE 5 is arranged to display the content of that file directory 17, whereby the content comprises the files that are available in that file directory 17. Put differently, the UE 5 presents the files in its associated NB-PDS 14 via the data bearer connection 13.

In order to clarify the above, reference numerals 17' and 19' are incorporated in the figure, wherein the file directory 17 is actually referring, or reflecting, the file directory 17' of the associated NB-PDS 14. The file directory structure 19 is reflecting, or referring, to the file directory structure 19' present on the associated NB-PDS 14.

A file directory symbol representing the file directory 17 may visually reflect whether the file directory 17' of the associated NB-PDS 14 is accessible for the UE 5, for example whether a data bearer connection 13 is established between the UE 5 and the access point server 12 or whether a data connection between the UE 5 and the PDSS 3 is active.

A yellow symbol 20 may, for example, indicate that the data connection is active and operational, meaning that the associated NB-PDS 14 is accessible. An orange directory symbol may indicate that the data connection is not active and operational, meaning that the associated NB-PDS 14 is not accessible.

In case the data connection is not active and operational, the UE 5 may still open the file directory 17 on the UE 5. The UE 5 may then comprise a local copy of metadata of content of the file directory 17' of its associated NB-PDS 14. As such, the UE 5 may cache any files or the like present on its associated NB-PDS 14 and may display, on the UE 5, an overview of the files based on any cached data. In such a case, the symbol 20 may comprise a dashed line reflecting that the overview is based on cached data and reflecting that the file directory 17 provides a view of the content of the associated NB-PDS 14 only, i.e. the content of the associated NB-PDS 14 can then not be accessed by the UE 5.

In a practical implementation, the PDSS 3 may be any of a HSS, a HSS Front-End, HSS-FE, HSS-FE or a Centralized User Data Base, CUDB. Rationale is that a mobile network operator already comprises a subscription database, comprising subscription records of the UE subscribes, such as the UE 5. The subscription database comprises a high level of reliability, security functionality, auditing capability, data backup, data integrity, etc. Using this infrastructure also for personal data storage would mean more mileage to be gained from this infrastructure, i.e. more efficient usage.

Figure 2:
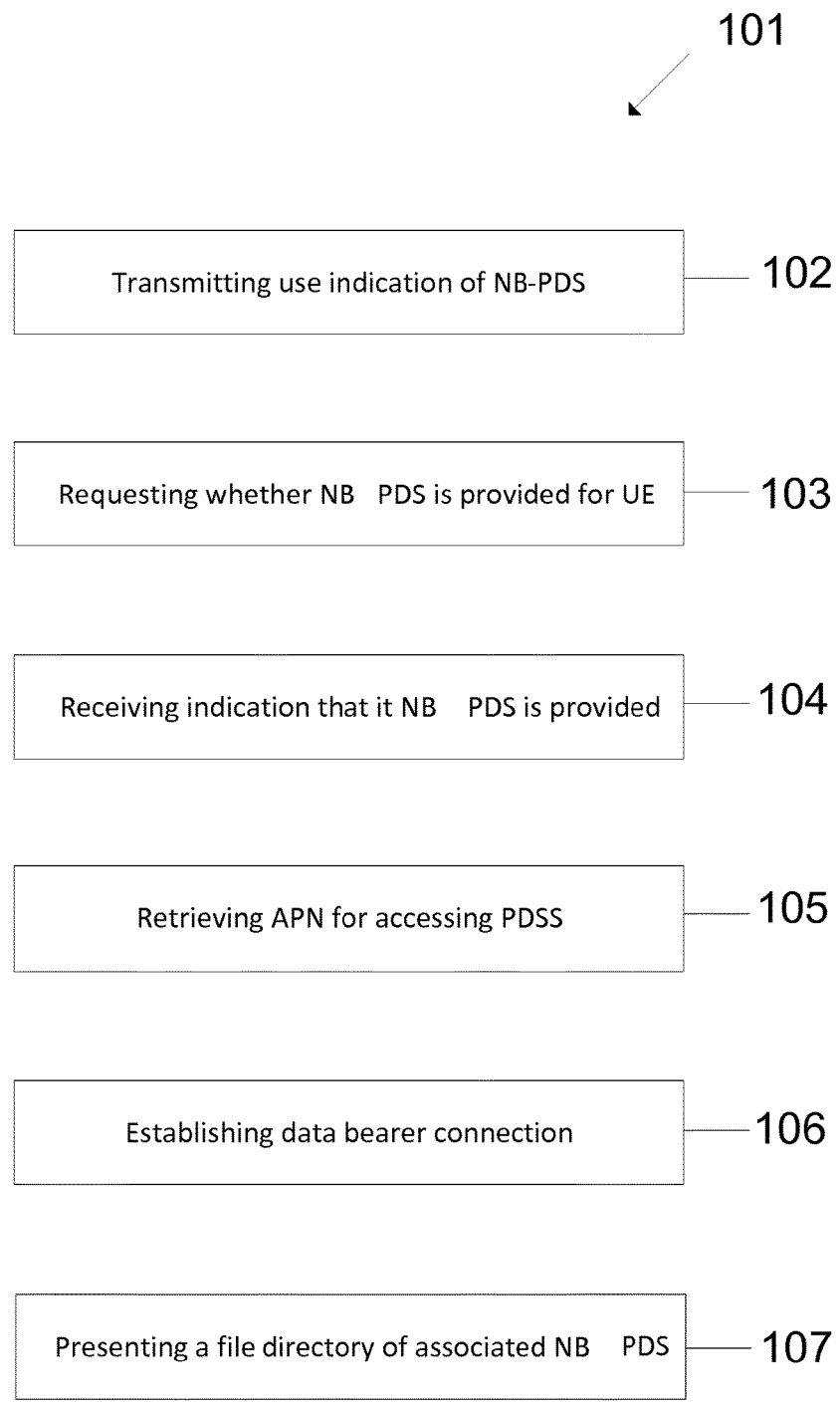
FIG. 2 is a flowchart illustrating an embodiment of method steps.

FIG. 2 is a flowchart 101 illustrating a schematic view of a method of accessing in a telecommunication network a NB-PDS 4 associated with a UE 5, wherein the telecommunication network at least comprises a control server 2 and a PDSS 3 controlling the NB-PDS 4.

In a first step, the method comprises transmitting 102, by the UE 5, to the control server 2, an indication for supporting NB-PDS functionality by the UE 5. The use indication may be an NB-PDS parameter comprised in a Request message, such as an Attach request message which is a message sent by the UE 5 to the telecommunication network, the target of the message is the control server 2, in order to perform an attach procedure.

Next, a subscription server 10 is requested 103, by the control server 2, whether NB-PDS 4 is provided for the UE 5. The subscription server 10 may then determine that the UE 5 is entitled to the NB-PDS 4 based on subscription information available for that UE 5. Once it has been determined that the UE 5 is entitled to that service, the control server 2 may receive 104, from the subscription server 10, in response to the request, an indication that the NB-PDS 4 is provided for the UE 5.

The control server 2 will then retrieve 105 an Access Point Name, APN, of an access point server 12 for accessing the PDSS 3 through a data bearer connection 13 in the telecommunication network. Such an APN should be designed, i.e. capable, to set up a data connection to the PDSS 3, for example an FTP or HTTP connection, such that the UE 5 is able to access the data stored on its associated NB-PDS 14.

Once the APN 12 is selected, a data bearer connection 13 is established 106 between the UE 5 and the access point server 12. Next, under control of the control server 2, a data connection between the UE 5 and the PDSS 3 over the data bearer connection 13 is established, which is providing data access by the UE 5 to its associated NB-PDS 14.

Finally, a file directory 17 is presented 107 to the user, by the UE 5, of the associated NB-PDS 14 in a file directory structure 19 of the UE.

Figure 3:
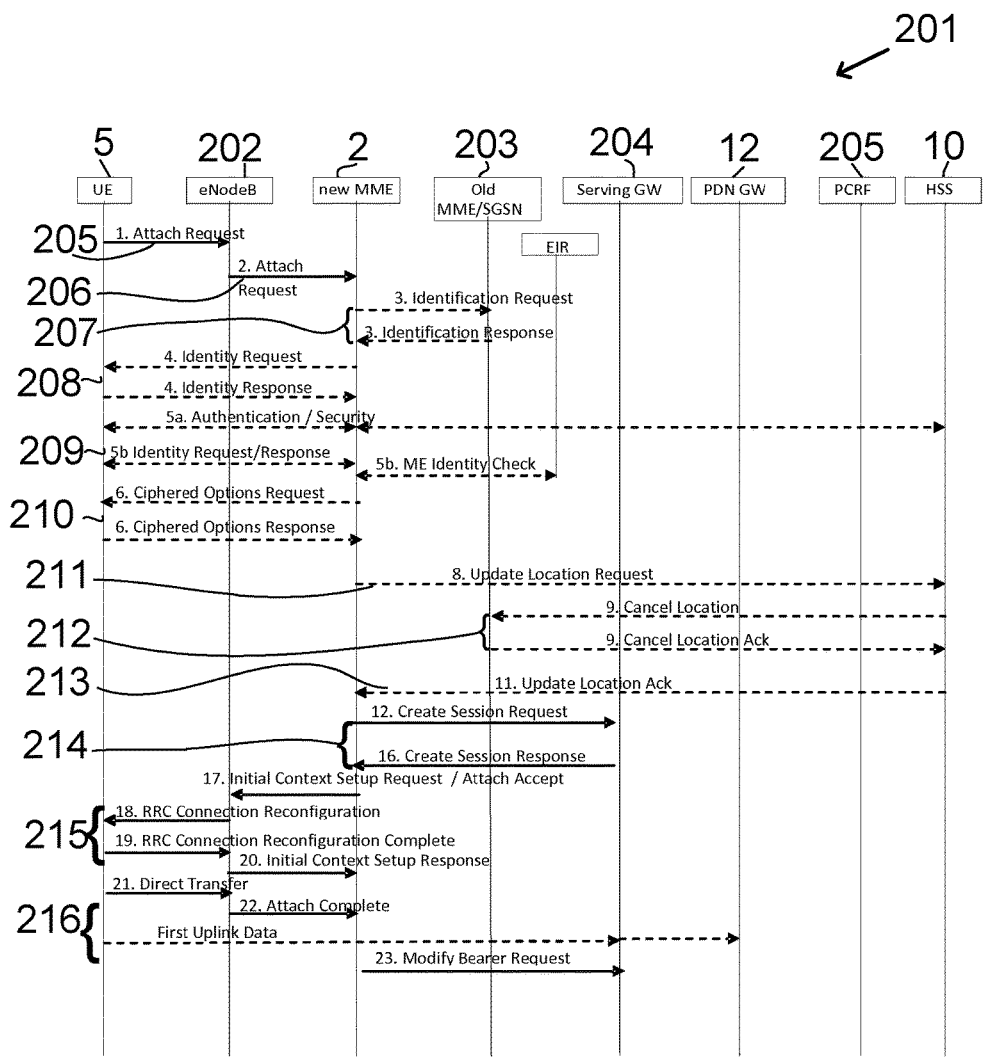
FIG. 3 is a signalling diagram illustrating an Attach procedure in an embodiment of a network.

FIG. 3 is a signalling diagram 201 illustrating a schematic view of a method of accessing, in a telecommunication network, an NB-PDS 14, being the HSS 10, associated with a UE 5, wherein the telecommunication network at least comprising an MME 2 and a PDSS 3.

At step 205, the UE 5 initiates attachment to the telecommunication network, i.e. EPS, by sending an Attach Request message over the radio access network towards the Evolved Node B 202, and this Attach Request message is, in step 206, forwarded to the MME 2. This MME 2 is selected, in a traditional manner, by the Evolved Node B 202.

In order for the UE 5 to express the intention to make use of an associated NB-PDS 14, the UE 5 includes an indication in the Attach Request message, for example an NB-PDS parameter, indicating that it supports, and/or wants to use, the NB-PDS 4 functionality.

In the case that the MME 2 has changed since detach of the UE 5, the MME 2 may derive the old MME 203 from a parameter comprised in the Attach Request message. The MME 2 may then send an Identification Request to the old MME 203 to request the International Mobile Subscriber Identity, IMSI, of the UE 4. The request is sent to the old MME 203, which old MME 203 verifies the Attach Request message and then responds with the IMSI of the UE 5. In a similar approach, the request may be sent to an old SGSN, wherein the old SGSN verifies the Attach Request message and then responds with the IMSI of the UE 5. The above is indicated with the steps referenced to with reference numeral 207.

If the UE 5 is unknown in both the old MME/SGSN 203 and the MME 2, the MME 2 sends an Identity Request to the UE 5 to request the IMSI. The UE responds with an Identity Response comprising its IMSI. These steps are referenced to with reference numeral 208.

Next, authentication and security checks 209 are performed to activate integrity protection and NAS ciphering, under control of the MME 2.

If the UE 5 has set the Ciphered Options Transfer Flag in the Attach Request message, the Ciphered Options shall be retrieved from the UE 5. In order to handle situations where the UE 5 may have subscriptions to multiple PDN's, if the Protocol Configuration Options contains user credentials, then the UE 5 should also send the APN to the MME 2. These steps are indicated with reference numeral 210.

At step 211, the MME 2 contacts the HSS 10, using Update Location Request, and requests subscription information from the HSS 10, such that the MME 2 is able to accept the attachment request by the UE 5. In accordance with the present invention, the MME 2 may include an indication in the Update Location Request message, for example an NB-PDS parameter, to indicate to the HSS 10 that the UE 5 supports NB-PDS 14 functionality.

The HSS 10 will then send a Cancel Location to the old MME 203, which the old MME 203 acknowledges with a Cancel Location Ack and, the old MME 203 will remove any bearer contexts. These steps are indicated with reference numeral 212.

In step 213, the HSS 10 responds to the MME 2 by sending Update Location Ack, ULA. The ULA message comprises a set of APNs, of which at least one is designated for establishing a data bearer connection 13 for accessing the PDSS 3. The ULA message may comprise an indication that NB-PDS 4 is provided for the UE 5, for example a parameter within the ULA message. The parameter may comprise a sub-parameter, name the APN that may be used for establishing the data bearer connection 13 for accessing the PDSS 3.

In step 214, the initial steps are performed for establishing data bearer connections for the UE, which steps are directed to the serving Gateway, SGW 204. Next, in step 215 the MME 2 sends the Attach Accept message towards the UE 5. The Attach Accept message may include a parameter, for example the parameter NB-PDS_provided, indicating that the UE 5 is entitled to its NB-PDS 14. The Attach Accept message may further comprise the selected APN.

The remainder of the signalling steps in the diagram, indicated by reference numeral 216, are merely incorporated to display a complete attach procedure for the UE 5.

Figure 4:
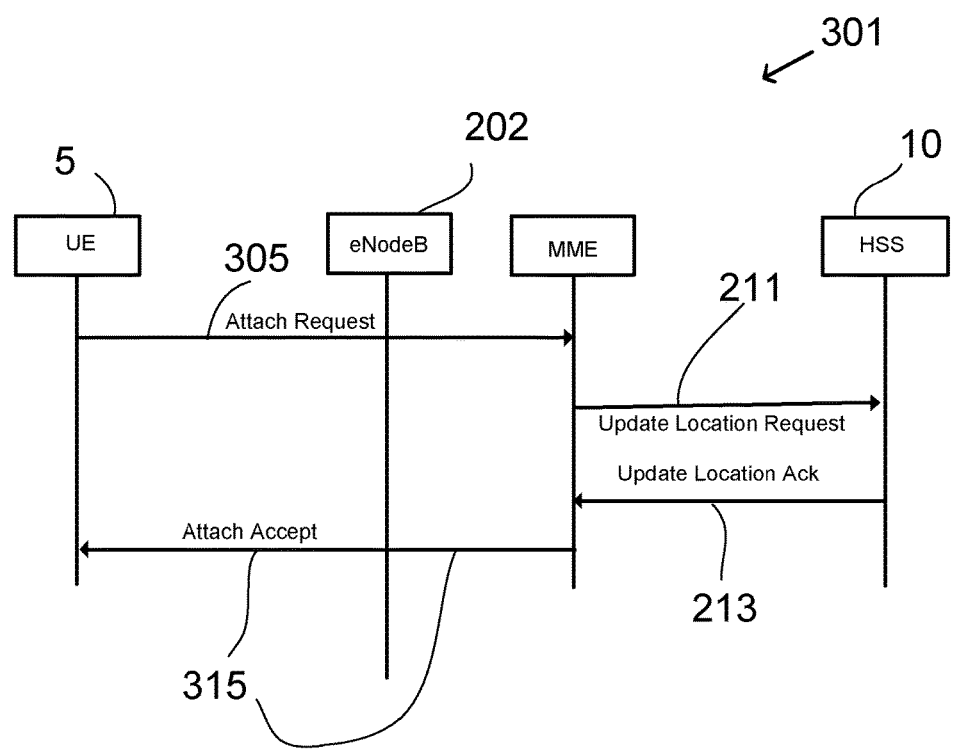
FIG. 4 is a signalling diagram illustrating an exchange of signals in an embodiment of a network.

FIG. 4 is a signalling diagram 301 illustrating an embodiment in which conventional steps occurring in an attachment procedure for the UE 5 are amended according to the present invention.

Here, as indicated before, the UE 5 initiates attachment to the telecommunication network, i.e. EPS, by sending 305 an Attach Request message over the radio access network towards the Evolved Node B 202, and this Attach Request message is, in step 206, forwarded to the MME 2. This MME 2 is selected by the Evolved Node B 202. The UE 5 may incorporate an NB-PDS_requested parameter in the Attach Request message. The table below comprises a snapshot of the Attach Request message.

| IEI | Information Element | Type/ Reference | Presence | Format | Length |
|---|---|---|---|---|---|
| | Protocol discriminator | Protocol discriminator | M | V | ½ |
| | Security header type | Security header type | M | V | ½ |
| | Attach request message identity | Message type | M | V | 1 |
| ... | | | | | |
| C- | MS network feature support | MS network feature support | O | TV | 1 |
| 10 | TMSI based NRI container | Network resource identifier container | O | TLV | 4 |
| 1A | NB-PDS_requested | Network based personal data storage | O | T | 1 |

The NB-PDS_requested parameter indicates by virtue of its presence that the UE 5 provides an indication of supporting NB-PDS functionality by the UE 5.

The MME 2 may then incorporate, in the Update Location Request 211, the parameter NB-PDS_requested to indicate to the HSS 10 that the UE 5 wants to use its associated NB-PDS 14. The table below provides an example of parameters comprised in the Update Location Request.

| Information element name | Mapping to Diameter AVP | Cat. | Description |
|---|---|---|---|
| IMSI | User-Name (See IETF RFC 3588 [4]) | M | This information element shall contain the user IMSI, formatted according to 3GPP TS 23.003, clause 2.2. |
| Supported Features (See 3GPP TS 29.229) | Supported-Features | O | If present, this information element shall contain the list of features supported by the origin host. |
| ... | | | |
| UE SRVCC Capability | UE-SRVCC-Capability | C | This information element shall indicate if the UE supports or does not support the SRVCC capability and shall be present if the MME or the SGSN supports SRVCC and this information is available to the MME or the SGSN. |
| NB-PDS_requested | NB-PDS_requested | O | This information element indicates, by virtue of its presence, that the UE requests for this attachment to utilize the Network based Personal data storage feature. |

In an embodiment, the Update Location Request message is not amended with the NB-PDS_requested parameter. The HSS 10 may, in that case, upon its own initiative, include information in the Update Location Answer message which enables the MME 2 to offer this feature to the UE 5. As such, the MME 2 may, actively, request the UE 5 whether the UE 5 wants to use its associated NB-PDS 14.

The update Location Answer 213 may be construed by the HSS 10 such that it comprises a parameter NB-PDS_supported, indicating that the NB-PDS is provided for the UE 5. The table below provides a snapshot of the Update Location Answer message.

| Information element name | Mapping to Diameter AVP | Cat. | Description |
|---|---|---|---|
| Supported Features (See 3GPP TS 29.229) | Supported-Features | O | If present, this information element shall contain the list of features supported by the origin host. |
| ... | | | |
| ULA-Flags | ULA-Flags | C | This Information Element contains a bit mask. It shall be present only when the Result-Code AVP is DIAMETER_SUCCESS. |
| Subscription Data | Subscription-Data | C | This Information Element shall contain the complete subscription profile of the user. It shall be present if success is reported, unless an explicit "skip subscriber data" indication was present in the request. |

The Subscription data may then comprise the NB-PDS parameter. Another parameter may be incorporated, for example an APN-Configuration-Profile parameter for indicating the APN to be used for establishing the data bearer connection 13 for providing data access to the associated NB-PDS 14.

In an embodiment, the HSS 10 does not signal to the MME 2 that NB-PDS is provided for the UE 5. Here, the MME 2 may allow for establishing a data bearer towards an APN associated with NB-PDS 4 for every subscriber of the telecommunication network. The MME 2 may incorporate the NB-PDS_supported parameter in the Attach Accept message 315. The table below comprises a snapshot of the Attach Accept message.

| IEI | Information Element | Type/ Reference | Presence | Format | Length |
|---|---|---|---|---|---|
| | Protocol discriminator | Protocol discriminator | M | V | ½ |
| | Security header type | Security header type | M | V | ½ |
| | Attach accept message identity | Message type | M | V | 1 |
| ... | | | | | |
| 64 | EPS network feature support | EPS network feature support | O | TLV | 3 |
| F- | Additional update result | Additional update result | O | TV | 1 |
| 5E | T3412 extended value | GPRS timer 3 | O | TLV | 3 |
| 5F | NB-PBS_supported | Network based personal data storage | O | T | 1 |
| 60 | NB_PDS_APN | APN for Network based personal data storage | O | TLV | 3- |

The NB-PDS_supported parameter indicates, by virtue of its presence, that NB-PDS is supported for the UE 5. If the NB-PDS_supported parameter is present, then the APN may be present to be used during establishment of the data bearer connection 13.

Figure 5:
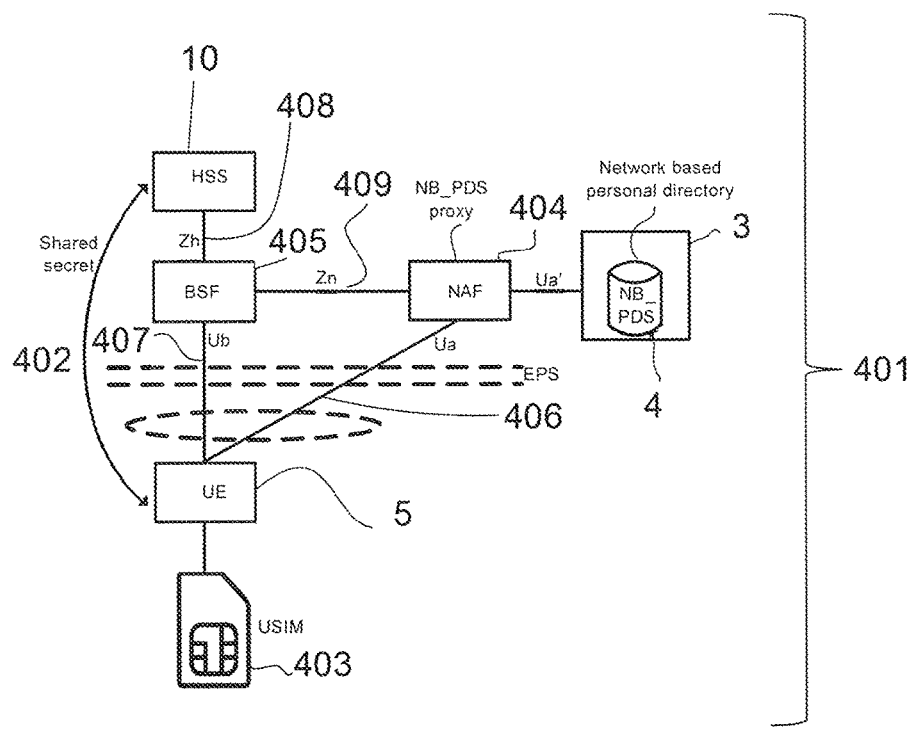
FIG. 5 is a block diagram illustrating an embodiment of a telecommunication network.

FIG. 5 is a block diagram illustrating a topology 401 of an embodiment of a telecommunication network illustrating authentication issues for the PDSS 3.

The NB-PDS concept of the present invention entails that personal and sensitive information is accessed from the UE 5. The UE 5, or actually the subscriber of the UE 5, may be authenticated through the Generic Authentication Architecture, GAA. GAA allows for using the strong authentication mechanism defined for GSM/3G/EPC, for authenticating the UE 5 for access to arbitrary applications. Extensive infrastructure is operational for enabling subscriber authentication based on the Authentication Key that is shared 402 between the HSS 10 and the Universal Subscriber Identity Module, USIM, 403.

GAA allows for using that mechanism also for authenticated access to network based applications, such as the NB-PDS 4. Hence, through the use of GAA, access to NB-PDS 4 is feasible from the UE 5 in the case the UE comprises a UICC containing a USIM 403.

The Network Based Personal Data Storage, NB-PDS 4 takes the role of a Network Application Function, NAF, 404 as specified for GAA. The architecture for GAA, including functional entities, such as Bootstrapping function, BSF, 405, and including various reference points, such as the Ua 406, Ub 407, Zh 408 and Zn 409 reference points, is considered known to the skilled person.

An advantage of the use of a NAF 404 is that the NAF 404 may be used for authentication through other access, e.g. through access over public internet.

Figure 6:
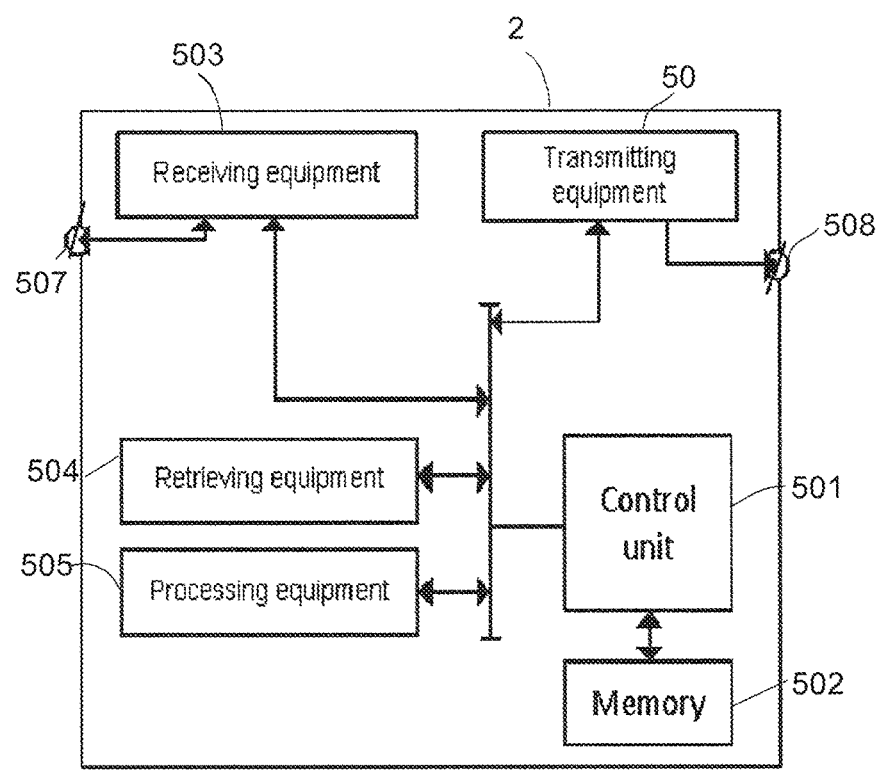
FIG. 6 is a block diagram illustrating an embodiment of a control server.

FIG. 6 is a schematic view of the control server 2 arranged for facilitating access in a telecommunication network to a NB-PDS 4, associated with a UE 5, wherein the telecommunication network comprises at least the control server 2 and the PDSS 3, enabling access to the NB-PDS 4.

The control server 2 comprises a control unit 501 and a memory 502, which control unit 501 is connected to receiving equipment 503, retrieving equipment 504, processing equipment 505 and transmitting equipment 506.

Incoming data packets or messages pass through the input terminal 507 before they reach the receiving equipment 503, or a receiving module. Outgoing data packets or messages pass, or are sent by the transmitting equipment 506, or a transmitting module, via the output terminal 508, for example towards the HSS 10.

The receiving equipment 503 is arranged for receiving an indication of supporting NB-PDS functionality, for example from the UE 5. The indication may be a parameter comprised in an Attach Request message 205 or may be comprised in a request for setting up a data bearer connection 13 to a an access point server 12.

The retrieving equipment 504 is arranged for retrieving, in response to the received indication, an APN of an access point server 12, for accessing the PDSS 3 through a data bearer connection 13 in the telecommunication network. As such, the data bearer connection 13 is to be established between the UE 5 and the access point server 12, as the access point server 12 acts as a gateway for providing data connectivity for the UE 5 to outside the EPC 9.

The processing equipment 505 is arranged for establishing that data bearer connection 13 between the UE 5 and the access point server 12. The processing equipment 505 is further arranged for establishing a data connection between the UE 5 and the PDSS 3 over the data bearer connection 13, thereby providing data access by the UE 5 to its associated NB-PDS 14.

Once the data connection is established between the UE 5 and the PDSS 3, the UE is able to present the file directory 17 of its associated NB-PDS 14 in a file directory structure 19 of the UE 5.

The control unit 501 is arranged to control the equipment 503, 504, 505 and 506 internal to control server 2 under instructions stored in memory 502.

Figure 7:
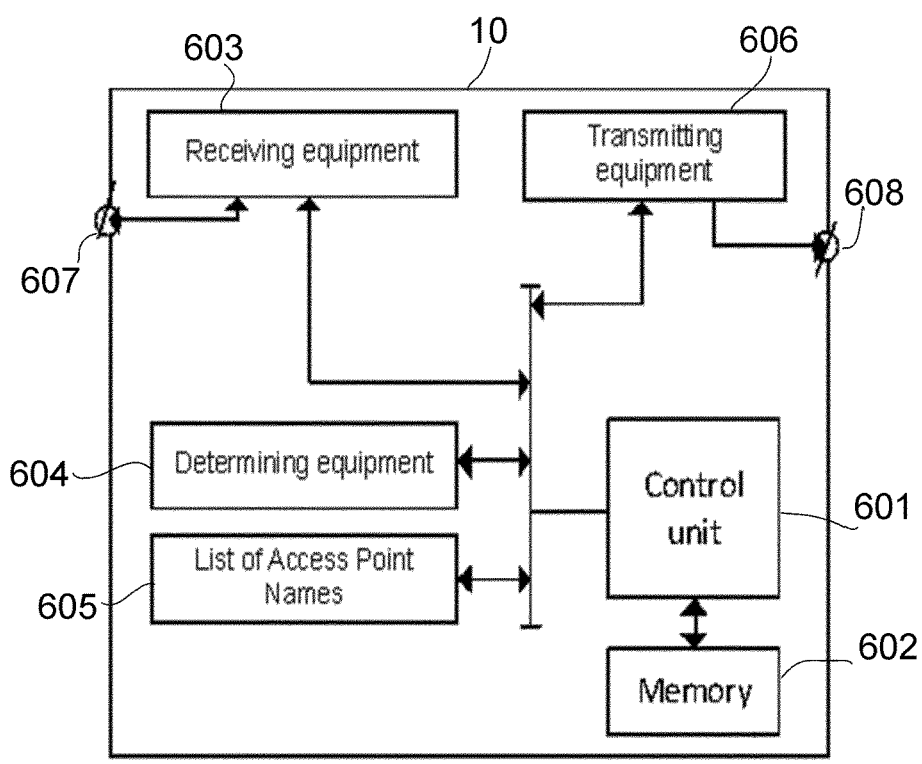
FIG. 7 is a block diagram illustrating an embodiment of a subscription server.

FIG. 7 is a schematic view of the subscription server 10 arranged for facilitating access in a telecommunication network to a NB-PDS 4, associated with a UE 5, wherein the telecommunication network comprises at least the control server 2 and the subscription server 10, enabling access to the NB-PDS 4.

The subscription server 10 comprises a control unit 601 and a memory 602, which control unit 601 is connected to receiving equipment 603, determining equipment 604, list of access point names module 605 and transmitting equipment 606.

Incoming data packets or messages pass through the input terminal 607 before they reach the receiving equipment 603, or a receiving module. Outgoing data packets or messages pass or are sent by the transmitting equipment 606, or a transmitting module, via the output terminal 608, for example towards the MME.

The receiving equipment 603 is arranged for receiving an indication of supporting NB-PDS functionality. The indication may be, for example a parameter comprised in an Update Location Request message 211. The determining equipment 604 is arranged for determining that the UE 5 is entitled to the NB-PDS 4, based on, for example, subscription information for that UE 5 available in the subscription server 10. The determining equipment 604 may then retrieve a list of access point names 605, one of which may be used by the UE 5 to establish a data bearer connection 13 to the access point server 12.

The control unit 601 is arranged to control the equipment 603, 604, 605 and 606 internal to subscription server 10 under instructions stored in memory 602.

Figure 8:
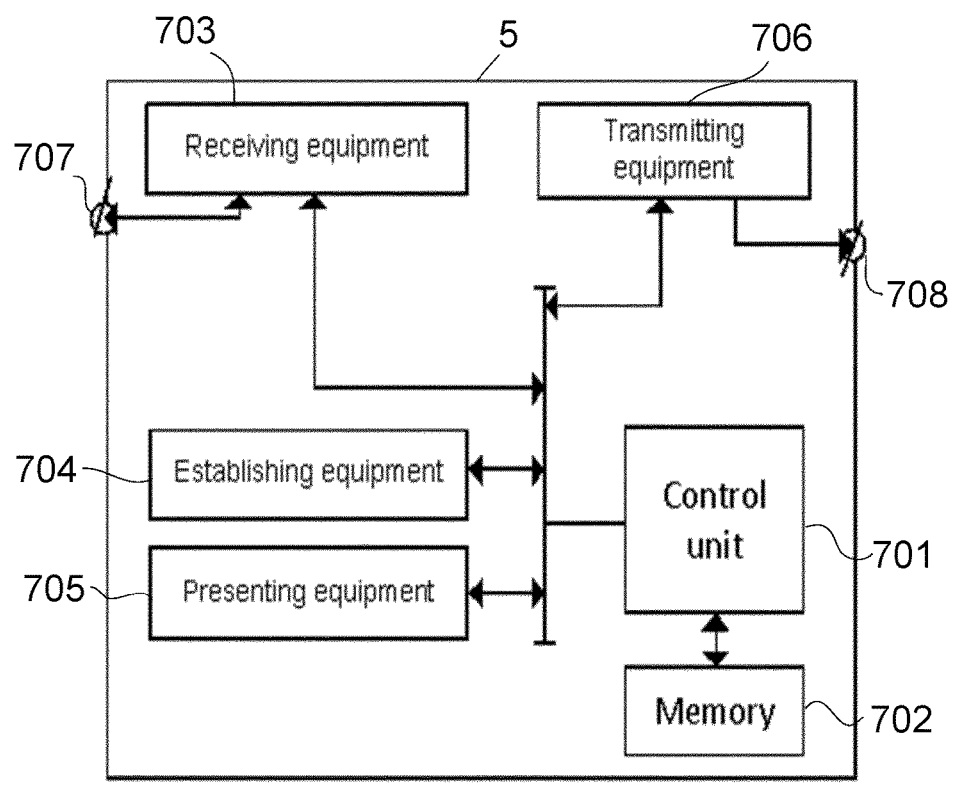
FIG. 8 is a block diagram illustrating an embodiment of a User Equipment.

FIG. 8 is a schematic view of the UE 5 arranged for facilitating access in a telecommunication network to a NB-PDS 4, associated with the UE 5, wherein the telecommunication network comprises at least the control server 2 and the subscription server 10, enabling access to the NB-PDS 4.

The UE 5 comprises a control unit 701 and a memory 702, which control unit 701 is connected to receiving equipment 703, establishing equipment 704, presenting equipment 705 and transmitting equipment 706.

Incoming data packets or messages pass through the input terminal 707 before they reach the receiving equipment 703, or a receiving module. Outgoing data packets or messages pass or are sent by the transmitting equipment 706, or a transmitting module, via the output terminal 708, for example towards the control server 2.

The transmitting equipment 706 is arranged for transmitting, for example to the control server 2, an indication of supporting NB-PDS functionality. Based on this initial indication, for example comprised in an Attach Request message 205, the UE 5 may receive, via receiving equipment 703, an APN of an access point server 12 for accessing the PDSS 3 through a data bearer connection 13 in the telecommunication network.

Once the APN of the access point server 12 has been received by the UE 5, via the receiving equipment 703, the establishing equipment 704 may initiate establishment of the data bearer connection 13 between the UE 5 and the access point server 12. The establishing equipment 704 is further arranged for initiating a data connection between the UE 5 and the PDSS 3 over the data bearer connection 13 providing data access by the UE 5 to its associated NB-PDS 14.

Finally, the presenting equipment 705, such as a screen or display, is arranged for presenting a file directory 17 of the associated NB-PDS 14 in a file directory structure of the UE 5.

The control unit 701 is arranged to control the equipment 703, 704, 705 and 706 internal to UE 5 under instructions stored in memory 702.

One of the advantages of the present invention is that data can easily be transferred from a local storage at the UE to a NB-PDS residing in, or in direct communication with the PDSS. Data items located in the associated NB-PDS may be made visible to the user, i.e. the UE, by at least providing the UE with metadata of these data items. As such, the file directory of the associated NB-PDS may be presented by the UE in a file directory structure of the UE even when the data connection between the UE and the PDSS has been lost, albeit that in such a case no data transfer can take place between the UE and the PDSS. To access the data items at the associated NB-PDS, a data connection between the UE and the PDSS is to be established.

Another advantage of the present invention is that security and authentication is controlled within the telecommunication network, which is assumed to be more secure than, for example, the public internet. The inventors noted that conventional cloud storage systems have a disadvantage in that the access thereto is controlled via the public internet, making any data item stored in these cloud systems more vulnerable against any form of piracy or hacking.

A further advantage of the present invention is that a telecommunications network provider may, if allowed so by the user, i.e. the UE, have direct access to the associated NB-PDS such that, for example, subscription data or the like may be introduced to the UE's network space.

The present invention is not limited to the embodiments as disclosed above, and can be modified and enhanced by those skilled in the art beyond the scope of the present invention as disclosed in the appended claims without having to apply inventive skills.

The invention claimed is:

1. A method of accessing, in a telecommunication network, a Network Based Personal Data Storage (NB-PDS) associated with a User Equipment (UE), the telecommunication network comprising at least a control server and a Personal Data Storage Server (PDSS) enabling access to the NB-PDS, the method comprising:
    transmitting, by the UE and to the control server, an indication of supporting NB-PDS functionality;
    retrieving, by the control server and in response to receiving the indication, an Access Point Name (APN) of an access point server for accessing the PDSS through a data bearer connection in the telecommunication network, the retrieving comprising:
        requesting, at a subscription server associated with the UE, whether the NB-PDS is associated with the UE;
        receiving, from the subscription server and in response to the request, information that the NB-PDS is associated with the UE;
    establishing, under control of the control server, the data bearer connection between the UE and the access point server;
    establishing, under control of the access point server, a data connection between the UE and the PDSS over the data bearer connection providing data access by the UE to the associated NB-PDS; and
    presenting, by the UE, a file directory of the associated NB-PDS in a file directory structure of the UE.

2. The method of claim 1, wherein the telecommunication network comprises any of an Evolved Packets System (EPS) network, a Universal Mobile Telecommunications System (UMTS) network, and a General Packet Radio Service (GPRS) network.

3. The method of claim 1, wherein the control server comprises any of a Mobility Management Entity (MME), and a Supporting General Packet Radio Service (GPRS) Support Node (SGSN).

4. The method of claim 1, wherein the access point server comprises any of a Public Data Network (PDN) Gateway (PDN-Gw), and a Gateway General Packet Radio Service (GPRS) Support Node (SGSN).

5. The method of claim 1, wherein the PDSS comprises any of a Home Subscriber Server (HSS), a HSS Front-End (HSS-FE), and a Centralized User Data Base (CUDB).

6. A method of facilitating access to a Network Based Personal Data Storage (NB-PDS) associated with a User Equipment (UE), implemented by a control server in a telecommunication network comprising a Personal Data Storage Server (PDSS) enabling access to the NB-PDS, the method comprising:
    receiving, from the UE, an indication of supporting NB-PDS functionality by the UE;
    retrieving, in response to the indication, an Access Point Name (APN) of an access point server, for accessing the PDSS over a data bearer connection in the telecommunication network, the retrieving comprising:
        requesting, at a subscription server associated with the UE, whether the NB-PDS is associated with the UE;
        receiving, from the subscription server and in response to the request, information that the NB-PDS is associated with the UE;
    establishing, under control of the control server, the data bearer connection between the UE and the access point server.

7. The method of claim 6, wherein receiving the indication comprises receiving an Attach request message comprising the indication of supporting NB-PDS functionality by the UE.

8. The method of claim 7, further comprising transmitting an Attach accept message comprising the APN of the access point server for establishing the data bearer connection.

9. The method of claim 6, wherein receiving the information from the subscription server comprises receiving, from the subscription server, the APN of the access point server for accessing the PDSS in the telecommunication network.

10. The method of claim 6, wherein receiving the indication comprises receiving, from the UE, a request message for initiating establishment of the data bearer for accessing the PDSS.

11. The method of claim 6, wherein retrieving the APN further comprises configuring the APN for the establishing of the data bearer connection.

12. A control server configured to facilitate access, in a telecommunication network, to a Network Based Personal Data Storage (NB-PDS) associated with a User Equipment (UE), the telecommunication network at least comprising a control server and a Personal Data Storage Server (PDSS) controlling the NB-PDS, the control server comprising:
processing circuitry;
memory containing instructions executable by the processing circuitry whereby the control server is operable to:
receive an indication of supporting NB-PDS functionality;
retrieve, in response to the indication, an Access Point Name (APN) of an access point server for accessing the PDSS through a data bearer connection in the telecommunication network, and whereby to retrieve the APN the control server is operable to:
request, at a subscription server associated with the UE, whether the NB-PDS is associated with the UE;
receive, from the subscription server and in response to the request, information that the NB-PDS is associated with the UE;
control establishment of the data bearer connection between the UE and the PDSS providing data access to the associated NB-PDS and for
control establishment of a data connection between the UE and the PDSS over the data bearer connection providing data access by the UE to the associated NB-PDS.

13. The control server of claim 12, wherein to receive the indication, the control server is further operable to receive an Attach request message comprising the indication of supporting NB-PDS functionality by the UE.

14. The control server of claim 12, wherein to receive the information from the subscription server, the control server is operable to receive, from the subscription server, the APN of the access point server for accessing the PDSS in the telecommunication network.

15. The control server of claim 12, wherein to receive the indication the control server is further operable to receive, from the UE, a request message for initiating establishment of the data bearer for accessing the PDSS.

16. The control server of claim 12, wherein to retrieve the APN, the control server is further operable to configure the APN for the establishing of the data bearer connection.

17. A telecommunication network configured to facilitate access, in the telecommunication network, to a Network Based Personal Data Storage (NB-PDS) associated with a User Equipment (UE), the telecommunication network at least comprising:
a control server;
a Personal Data Storage Server (PDSS) enabling access to the NB-PDS;
the UE, wherein the UE comprises:
first processing circuitry;
memory containing first instructions executable by the first processing circuitry whereby the UE is operable to transmit, to the control server, an indication of supporting NB-PDS functionality;
wherein the control server comprises:
second processing circuitry;
memory containing second instructions executable by the second processing circuitry whereby the control is operable to:
retrieve, in response to receiving the indication, an Access Point Name (APN) of an access point server for accessing the PDSS through a data bearer connection in the telecommunication network, and whereby to retrieve the APN the control server is operable to:
request, at a subscription server associated with the UE, whether the NB-PDS is associated with the UE;
receive, from the subscription server and in response to the request, information that the NB-PDS is associated with the UE;
establish the data bearer connection between the UE and the access point server; and
establish a data connection between the UE and the PDSS over the data bearer connection providing data access by the UE to the associated NB-PDS;
wherein the first instructions are such that the UE is further operable to present a file directory of the associated NB-PDS in a file directory structure of the UE.

18. The control server of claim 13, wherein the control server is further operable to transmit an Attach accept message comprising the APN of the access point server for establishing the data bearer connection.

* * * * *